United States Patent
Boiero et al.

(10) Patent No.: US 8,224,312 B2
(45) Date of Patent: Jul. 17, 2012

(54) METHOD AND NETWORK FOR DETERMINING AN ENVIRONMENT WHEREIN A MOBILE TERMINAL IS SITUATED

(75) Inventors: Gianluca Boiero, Turin (IT); Piero Lovisolo, Turin (IT)

(73) Assignee: Telecom Italia S.p.A., Milan (IT)

( * ) Notice: Subject to any disclaimer, the term of this patent is extended or adjusted under 35 U.S.C. 154(b) by 455 days.

(21) Appl. No.: 12/312,855

(22) PCT Filed: Nov. 30, 2006

(86) PCT No.: PCT/EP2006/069174

§ 371 (c)(1),
(2), (4) Date: Sep. 1, 2009

(87) PCT Pub. No.: WO2008/064721

PCT Pub. Date: Jun. 5, 2008

(65) Prior Publication Data

US 2010/0069057 A1    Mar. 18, 2010

(51) Int. Cl.
*H04M 3/00* (2006.01)
*H04W 24/00* (2009.01)
(52) U.S. Cl. ........................................ 455/419; 455/425
(58) Field of Classification Search .......... 455/418–420, 455/423–425, 456.1–456.6, 550.1, 90.1
See application file for complete search history.

(56) References Cited

U.S. PATENT DOCUMENTS

| | | | |
|---|---|---|---|
| 7,130,645 B2 * | 10/2006 | Llombart-Juan et al. | 455/456.3 |
| 7,184,745 B2 * | 2/2007 | Ballantyne et al. | 455/404.2 |
| 7,421,276 B2 * | 9/2008 | Steer et al. | 455/456.1 |
| 7,529,543 B2 * | 5/2009 | Dale | 455/419 |
| 2002/0050944 A1 | 5/2002 | Sheynblat et al. | |
| 2004/0204026 A1 | 10/2004 | Steer et al. | |
| 2006/0224730 A1 | 10/2006 | Fok et al. | |
| 2010/0232301 A1 * | 9/2010 | Omori | 370/252 |

FOREIGN PATENT DOCUMENTS

WO   WO 2004/091143 A2   10/2004
WO   WO 2006/105296 A1   10/2006

* cited by examiner

*Primary Examiner* — Brandon Miller
(74) *Attorney, Agent, or Firm* — Finnegan, Henderson, Farabow, Garrett & Dunner, L.L.P.

(57) ABSTRACT

A method of determining an environment wherein a mobile terminal of a mobile radiocommunication network is situated, the mobile terminal being associated to an identifier. The method includes: i) retrieving the identifier; ii) retrieving at least one technical feature of the mobile terminal according to the identifier, the one technical feature being related to the capability of the mobile terminal of receiving a radio signal; iii) taking a measurement indicative of a quality of the radio signal at the mobile terminal; and iv) applying to the measurement an operation for determining the environment, the operation depending on at least one parameter, wherein the method further includes, before step iv), v) adjusting at least one of the at least one parameter and the measurement according to the at least one technical feature.

24 Claims, 10 Drawing Sheets

US 8,224,312 B2

METHOD AND NETWORK FOR DETERMINING AN ENVIRONMENT WHEREIN A MOBILE TERMINAL IS SITUATED

CROSS REFERENCE TO RELATED APPLICATION

This application is a national phase application based on PCT/EP2006/069174, filed Nov. 30, 2006.

TECHNICAL FIELD

The present invention generally relates to the field of mobile radiocommunication networks. More particularly, the present invention relates to a method and a network apparatus for determining, in a mobile radiocommunication network, the environment wherein a mobile terminal is situated.

BACKGROUND ART

As it is known, a mobile radiocommunication network is adapted to provide voice, video and/or data services to a plurality of users, each user being provided with a respective mobile terminal. Examples of mobile radiocommunication networks are GSM networks (Global System for Mobile communications) or UMTS networks (Universal Mobile Telecommunications System).

In a mobile radiocommunication network, each user, with his own mobile terminal, is free to move within the geographical area covered by the network, thus changing both terrestrial coordinates and environment wherein he is situated. For instance, a user may typically move between indoor environments such as his home or his office, and outdoor environments of different types (urban environments, country environments, or the like). In the following description and in the claims, the term "environment" will designate the environment wherein a mobile terminal is situated, with particular regard to the existence and/or quality (e.g. configuration, consistency, etc) of physical structures surrounding the mobile terminal. Further, "indoor environment" will designate a substantially closed environment such as a building (apartment, house, office, . . . ). Conversely, "outdoor environment" will designate a substantially open environment such as a street, a garden, a country, a beach, . . . or an environment closed with light structures such as a vehicle compartment (car, train, etc.).

As it is known (Location Based Services), a service provider may offer to its users mobile radiocommunication services based on geographical location (e.g. defined by terrestrial coordinates) of mobile terminals of its users. For instance, a service provider may provide its users with a traffic report service, wherein each user only receives news relative to traffic in the geographic area wherein he is located. It is also known that the GPS network (Global Positioning System) may provide the geographical location of a GPS receiver, possibly integrated or associated to a mobile terminal.

Recently, service providers are more and more interested in offering to their users mobile radiocommunication services based on the environment wherein users are situated. For instance, a traffic report service similar to the above cited could be offered to users only after exiting their house. To this purpose, a service provider should be able to determine the environments wherein its users with their own mobile terminals are situated, possibly in addition to their geographical location.

US 2002/0050944 describes a method and apparatus for measurement processing of Satellite Positioning System (SPS) signals. A plurality of SPS signals from a corresponding plurality of SPS satellites are received in an SPS receiver. The signal environment corresponding to the location in which the SPS receiver is situated is characterized to produce signal environment data. In particular, the signal environment is classified as "indoor" or "outdoor". In one embodiment described by US 2002/0050944, this information is derived from available GPS-based measurements. For example, the distribution of signal-to-noise ratio and/or signal attenuation and the satellite line-of-sight information (azimuth and elevation angles) may indicate an indoor environment as opposed to an outdoor environment. Signal attenuation is computed as the difference between the measured input signal level and the expected input signal level. According to US 2002/0050944, the signal environment may be identified as "indoor" if the signals for all satellites in-view are attenuated by a specified threshold level. In an alternative embodiment disclosed by US 2002/0050944, signal levels from a base station to a handset, are used to aid the signal environment determination.

SUMMARY OF THE INVENTION

The Applicant has noticed that the above solution exhibits some drawbacks. Indeed, the above solution does not take into account the fact that typically a service provider has to provide services to a plurality of mobile terminals of different types, i.e. of different brands and different models. Since terminals of different types typically have different functionalities and different technical features (in terms of reception features, transmission features, or the like), applying the above solution to a plurality of mobile terminals of different types would disadvantageously lead to mistakes in the determination of terminal environments. This would disadvantageously induce the service provider to provide services with wrong contents to its users, which is undesirable.

Therefore, the general object of the present invention is providing a method and a network apparatus of a mobile radiocommunication network which is adapted to determine an environment wherein a mobile terminal is situated, which overcome the aforesaid problems.

More particularly, an object of the present invention is providing a method and a network apparatus of a mobile radiocommunication network which is adapted to determine an environment wherein a mobile terminal is situated, which is substantially independent of the type of mobile terminal. This would advantageously allow applying the method to a plurality of mobile terminals of different types, while minimising the amount of mistakes in the determination of the environments of such mobile terminals.

According to a first aspect, the present invention provides a method of determining an environment wherein a mobile terminal of a mobile radiocommunication network is situated, said mobile terminal being associated to an identifier, the method comprising:

i) retrieving said identifier;
ii) retrieving at least one technical feature of said mobile terminal according to said identifier, said one technical feature being related to the capability of said mobile terminal of receiving a radio signal;
iii) taking a measurement indicative of a quality of said radio signal at said mobile terminal; and
iv) applying to said measurement an operation for determining said environment, said operation depending on at least one parameter, wherein said method further comprises, before said step iv), v) adjusting at least one of said at least one parameter and said measurement according to said at least one technical feature.

Preferably, at least the steps i) and ii) are performed at a network apparatus of said mobile radiocommunication network.

Preferably, said identifier is an international mobile equipment identity of said mobile terminal.

Preferably, said step ii) comprises reading in a first database at least one of a brand and a model of said mobile terminal according to said identifier.

Preferably, said step ii) further comprises reading said at least one technical feature in a second database according to said at least one of the brand and the model of said mobile terminal.

In one embodiment, said at least one technical feature comprises a sensitivity of a receiver of said radio signal comprised in said mobile terminal.

In one embodiment, said at least one technical feature comprises an attenuation of said radio signal due to a package of the mobile terminal.

In one embodiment, said at least one technical feature comprises an equivalent antenna gain of a receiver of said radio signal comprised in the mobile terminal.

Said radio signal is possibly emitted by said mobile radiocommunication network.

Preferably, the method further comprises reading in a third database network configuration information about said mobile radiocommunication network.

In one embodiment, said radio signal belongs to a satellite positioning system network.

Said step v) may further comprise using said network configuration information.

Said step v) may further comprises adjusting according to a geographic position of said mobile terminal.

Said measurement may include one or more of the following measurements: a measurement of received signal power, a measurement of received signal-to-noise ratio, a measurement of multipath interference.

Preferably, said step iii) and said step iv) are periodically performed.

In one embodiment, said step iv) and said step v) are performed by said mobile terminal.

In one embodiment, said step iv) and said step v) are performed by a network apparatus of said mobile radiocommunication network.

Said operation may comprise comparing said measurement with at least a threshold.

According to a second aspect, the present invention provides a mobile radiocommunication network comprising: a mobile terminal associated to an identifier, said mobile terminal being adapted to take a measurement indicative of a quality of a radio signal received at said mobile terminal; a first database storing at least one technical feature of said mobile terminal related to the capability of said mobile terminal of receiving said radio signal; a network apparatus adapted to retrieve said at least one technical feature of said mobile terminal from said first database according to said identifier; a processor adapted to apply to said measurement an operation for determining an environment wherein said mobile terminal is situated, said operation depending on at least one parameter, wherein said processor is further adapted to adjust at least one of said at least one parameter and measurement according to said at least one technical feature.

In one embodiment, said processor is included in said network apparatus.

In one embodiment, said processor is included in said mobile terminal.

Preferably, said identifier is an international mobile equipment identity of said mobile terminal.

Preferably, the network further comprises a second database storing at least one of a brand and a model of said mobile terminal, said network apparatus being adapted to read in said second database at least one of the brand and the model of said mobile terminal according to said identifier.

Preferably, said network apparatus is adapted to retrieve said at least one technical feature of said mobile terminal from said first database according to at least one among the brand and the model of said mobile terminal.

In one embodiment, the at least one technical feature comprises a sensitivity of a receiver of said radio signal comprised in said mobile terminal.

In one embodiment, said at least one technical feature comprises an attenuation of said radio signal due to a package of the mobile terminal.

In one embodiment, said at least one technical feature comprises an equivalent antenna gain of a receiver of said radio signal comprised in the mobile terminal.

In one embodiment, said radio signal belongs to said mobile radiocommunication network.

In one embodiment, said radio signal belongs to a satellite positioning system network.

Preferably, the network further comprises a third database storing network configuration information about said mobile radiocommunication network, said network apparatus being further adapted to read said network configuration information from said third database.

In one embodiment, said processor is adapted to use said network configuration information for adjusting at least one of said at least one parameter and said measurement.

In one embodiment, said processor is further adapted to adjust at least one among said at least one parameter and said measurement according to a geographic position of said mobile terminal.

The measurement may include one or more of the following measurements: a measurement of received signal power, a measurement of received signal-to-noise ratio, a measurement of multipath interference.

Said processor may be adapted to compare said measurement with at least a threshold.

According to a third aspect, the present invention provides a computer program for determining, when said program is run on a computer, an environment wherein a mobile terminal of a mobile radiocommunication network is situated, said mobile terminal being associated to an identifier, said computer program comprising:

i) identifier retrieving code for retrieving said identifier;

ii) technical feature retrieving code for retrieving at least one technical feature of said mobile terminal according to said identifier, said one technical feature being related to the capability of said mobile terminal of receiving a radio signal;

iii) reading code for reading a measurement indicative of a quality of said radio signal at said mobile terminal; and iv) applying code for applying to said measurement an operation for determining said environment, said operation depending on at least one parameter, wherein said computer program further comprises v) adjusting code for adjusting at least one of said at least one parameter and said measurement according to said at least one technical feature.

In one embodiment, said applying code and said adjusting code reside on a network apparatus of said mobile radiocommunication network.

In one embodiment, said applying code and said adjusting code reside on said mobile terminal.

BRIEF DESCRIPTION OF THE DRAWINGS

The present invention will become more clear by reading the following detailed description, given by way of example and not of limitation, to be read with reference to the accompanying drawings, wherein.

DETAILED DESCRIPTION OF PREFERRED EMBODIMENTS OF THE INVENTION

Figure 1:
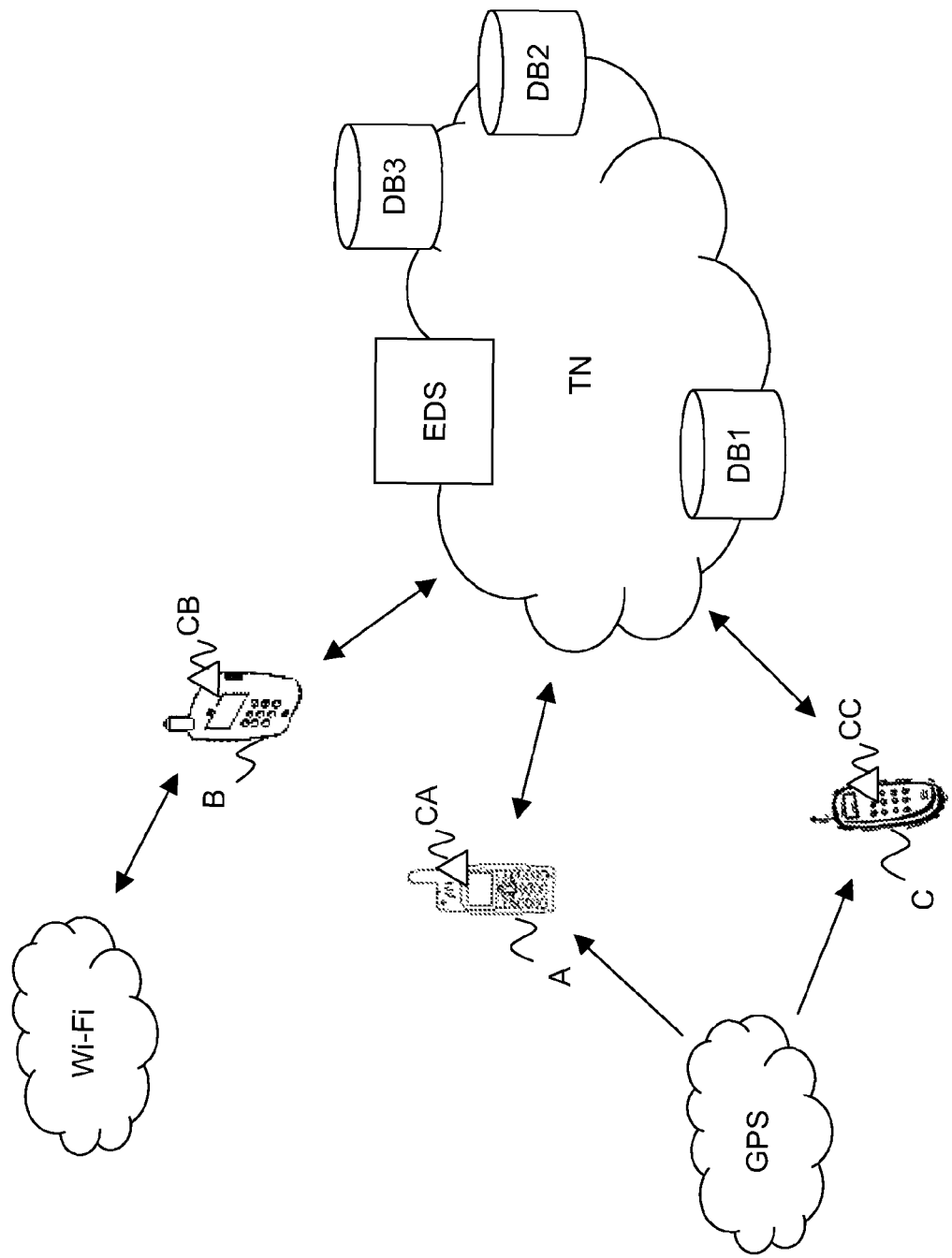
FIG. 1 schematically shows a mobile radiocommunication network which is adapted to implement the method according to an embodiment of the present invention.

FIG. 1 schematically shows a mobile radiocommunication network TN. In the following, it is assumed that the network TN comprises a mobile telephone network, such as a GSM network or a UMTS network.

A plurality of mobile terminals are radio connected to the network TN. By way of example, only three mobile terminals A, B and C are shown in FIG. 1. In particular, the mobile terminals A, B and C are connected to the network TN by means of radio access devices of the network TN, which are not shown in FIG. 1. For instance, in case the network TN is a GSM network, such radio access devices are the so-called Base Transceiver Stations. The mobile terminals A, B and C are of different types, i.e. they are of different brands and/or different models. By way of example, it is assumed that the terminal B is a dual-mode terminal, i.e. it is adapted to interact both with the mobile telephone network TN and with a radio access network such as the Wi-Fi network shown in FIG. 1. Further, it is assumed that terminals A and C are adapted to interact also with the GPS network, which is also shown in FIG. 1. Typically, terminals A and C include devices (e.g. antenna, amplifiers, etc) for receiving GPS signals and possibly for processing the received GPS signal. The role of the GPS network in the present invention may be taken by any Satellite Positioning System such as the Galileo Network or the like. Further, each mobile terminal A, B and C comprises a respective environment determination client CA, CB and CC, whose function will be explained in further detail herein after. Each environment determination client CA, CB and CC may be either resident on the terminal, or it may be stored on a removable card of the terminal (for example, the SIM card, in case the mobile terminal is a GSM mobile terminal).

The network TN comprises a first database DB1, which comprises configuration information relating to the network TN itself. For instance, in case the network TN is a GSM network, the first database DB1 may comprise, for each Base Transceiver Station, information such as: terrestrial coordinates, transmission frequencies, reception frequencies, transmission power, minimum reception power, equivalent antenna gain, radiation pattern, and so on.

Further, the network TN comprises a second database DB2, which comprises, for each mobile terminal adapted to interact with the network TN (i.e. A, B and C, in this example), a respective identifier. Such an identifier is adapted to univocally identify a mobile terminal. For instance, in case the network TN is a GSM or an UMTS network, the identifier may be the IMEI (International Mobile Equipment Identity) of the mobile terminal. In the second data base DB2, each identifier is preferably associated to terminal information such as the brand and/or the model of the mobile terminal.

Further, the network TN preferably comprises a third database DB3. The third database DB3 preferably comprises a list of brand codes and/or model codes of commercially available mobile terminals. In the present example, DB3 includes at least brand codes and/or model codes of the three terminals A, B and C. For each brand and/or model of commercially available mobile terminal, the third database DB3 stores technical feature information. More particularly, such technical feature information may comprise for instance one or more of the followings: the equivalent antenna gain (referred to a specific antenna dedicated to a specific radio signal, e.g. GPS or GSM signal), the additional attenuation due to the terminal package, the GPS chipset sensitivity (i.e. the sensitivity of the GPS receiver possibly included in the mobile terminal), and so on. Further, technical feature information relating to a given brand and/or model of mobile terminal may comprise type and/or version of the software loaded into the mobile terminal (including the operating system), functionalities of the terminal (i.e. whether the mobile terminal is adapted to interact also with a GPS network, with a Wi-Fi network, or the like), and information indicating whether environment determination is supported (i.e. whether an environment determination client is installed). Such technical feature information may be provided by the various mobile terminal manufacturers and/or derived from test measurement.

Further, the network TN advantageously comprises an environment determination server EDS. The server EDS may be either a dedicated network apparatus separated from other network apparatuses, or it may be integrated within another network apparatus of the network TN (not shown in FIG. 1) providing further functionality(ies) to the network. The server EDS may be implemented either via software, via hardware, or via a combination of hardware and software. For instance, such another network apparatus may be an application server, such as a GSM/UMTS based Localisation Server (LS), adapted to determine the geographical location (e.g. terrestrial coordinates or geographical area such as a mobile network cell) of mobile terminals of the network TN.

Herein after, an embodiment of the operation of the server EDS will be briefly described.

When a server provider wishes to provide one of its users (for instance the user of the mobile terminal A) with a mobile radiocommunication service which requires determination of the environment wherein the mobile terminal A is situated, an environment determination algorithm is applied to a measurement indicative of the quality of a radio signal received at the mobile terminal A from the network TN and/or the network GPS and/or the network Wi-Fi. Such an environment determination algorithm preferably comprises a set of operations. Each operation may depend on at least one parameter. An example of such an operation may be for instance, but not exclusively, a comparison between the measurement indicative of the signal quality (e.g. the signal strength) and one or more thresholds. The thresholds correspond to said parameters.

According to embodiments of the present invention, before application of the environment determination algorithm to the measurement indicative of the signal quality, the server EDS calculates the values of the parameters according to the technical feature information (stored in DB3) and possibly according to the network configuration information (stored in DB1). According to alternative embodiments of the present invention, the server EDS calculates the values of the parameters according to the network configuration information (stored in DB1) and it adjusts the measurements according to the technical feature information of the terminal (stored in DB3).

Then, the environment determination algorithm with the calculated parameters is applied to the measurement (or adjusted measurements) indicative of the signal quality, thus determining the environment wherein the mobile terminal A is situated.

Therefore, advantageously, the present invention allows adapting an environment determination algorithm to any type of mobile terminal, so that the environment determination algorithm becomes adapt to any type of mobile terminal. Indeed, for each mobile terminal of the network, the server EDS is able to use the identifier of the mobile terminal for retrieving technical feature information which, when possibly combined with network configuration information, allows either calculating parameters or adjusting measurements, thus allowing to adapt the algorithm to specific technical features of each mobile terminal. Therefore, the method of the present invention can be advantageously applied to a plurality of terminals of different types.

The operation of the server EDS will be described in detail more herein after, by referring to FIG. 2, which is a flow chart illustrating the method for determining the environment wherein a mobile terminal of the network of FIG. 1 is situated, according to an embodiment of the present invention.

When a service provider has to provide one of its users (for instance the user of the mobile terminal A) with a service which requires determination of the environment wherein the mobile terminal A is situated, the server EDS performs a first step 1, wherein it retrieves the terminal technical information of the mobile terminal A using the identifier of the mobile terminal A. More particularly, in a first sub-step 11, the server EDS retrieves the identifier of the mobile terminal A. In one exemplary embodiment the identifier may be directly sent by the mobile terminal (e.g. by the client) to the server EDS. In another exemplary embodiment the server EDS itself may retrieve the identifier from the network TN according to known techniques.

Then, the server EDS performs a second sub-step 12, wherein, by looking up the second database DB2, it retrieves information about the brand and/or model associated to the identifier, i.e. the brand and/or model of the mobile terminal A. Then, the server EDS performs a third sub-step 13, wherein, by using the information gathered from DB2, it retrieves from the third database DB3 technical feature information relative to mobile terminals with the brand and/or model of the mobile terminal A.

Optionally (shown in dashed), the server EDS performs a step 1a, wherein it reads from the first database DB1 configuration information relative to the network TN or GPS or Wi-Fi. In connection with this step 1a, the server EDS also acquires an at least approximate geographical location of the mobile terminal. The latter step may be performed using the localization capabilities of the GSM/UMTS network TN, as known in the art, or by using the GPS capabilities possibly present at the mobile terminal.

This step 1a is preferable in case the received signal for environment determination (step 3 below) is a signal from network TN (e.g. GSM/UMTS network). In fact, in this case it is advantageous to know an at least approximate location, so as to correlate this information with the network configuration information.

Then, during a subsequent step 2, the server EDS uses technical feature information retrieved from the third database DB3 during sub-step 13 (and optionally configuration information retrieved from the first database DB1 during step 1a) for calculating parameters for the environment determination algorithm.

Then, during a step 3, a measurement indicative of the quality of the signal received from the network TN is taken at the mobile terminal A. For instance, such a measurement may include one or more of the following measurements: a measurement of the received signal power, a measurement of the received signal-to-noise ratio, a measurement of the multi-path interference, or the like. Then, during a step 4, an environment determination algorithm having the parameters calculated during step 2 is applied to the measurement, for determining the environment wherein the mobile terminal A is situated.

According to embodiments of the present invention, steps 1, 1a, 2 and 4 are performed by the server EDS. The environment determination client CA of the terminal A only has to take the measurement and to transmit it to the server EDS. According to other embodiments of the present invention, only steps 1, 1a and 2 are performed by the server EDS, which then forwards the calculated parameters to the environment determination client CA. In this latter embodiments, then, the environment determination client CA has to take the measurement and apply the environment determination algorithm with the calculated parameters to the measurement, and then transmit the result, i.e. the identified environment, to the server EDS. In any case, the server EDS is always responsible of performing step 1, and 2, wherein terminal technical features are retrieved using the terminal identifier, and parameters of the environment determination algorithm are calculated by taking into account the terminal technical features (and possibly network configuration information).

Figure 3:
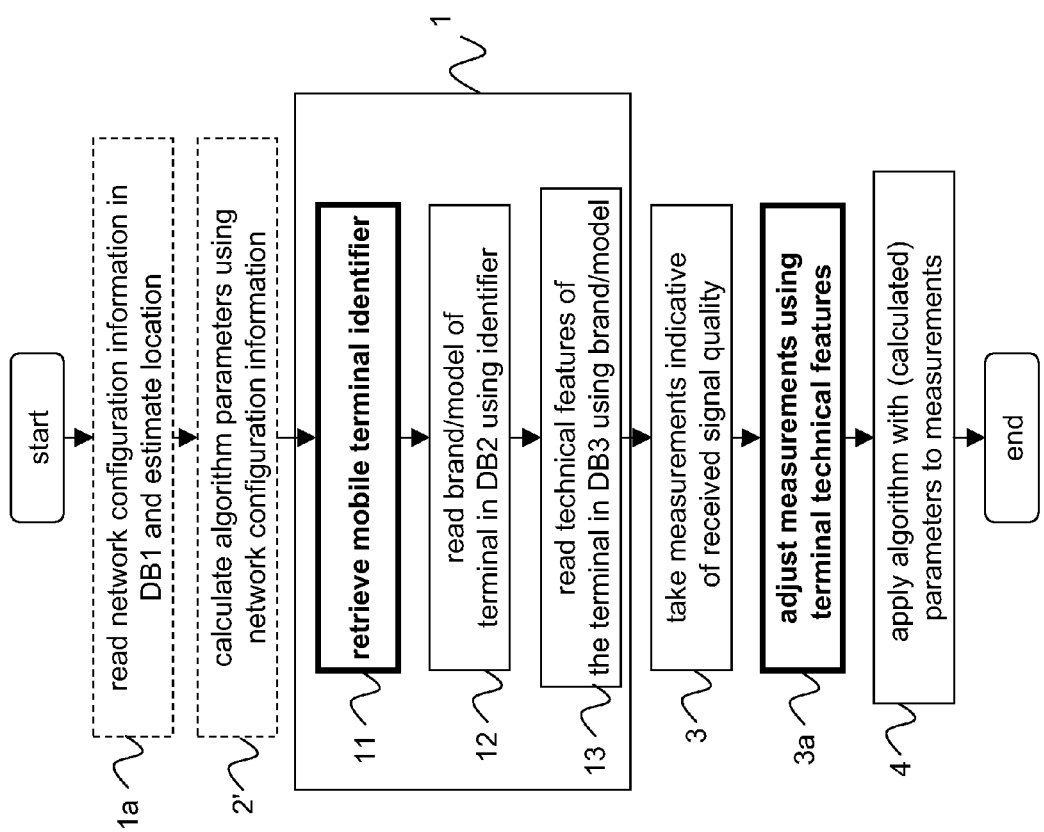
FIG. 3 is a flow chart illustrating an alternative embodiment of the method for determining the environment wherein a mobile terminal is situated.

FIG. 3 shows an alternative embodiment of the method of the present invention, wherein terminal technical features are used for adjusting measurements instead of for calculating parameters as in the previous embodiment.

As shown in FIG. 3, the server EDS optionally performs the step 1a, wherein it reads from the first database DB1 configuration information relative to the network TN or GPS or Wi-Fi and it acquires an at least approximate geographical location of the mobile terminal. Then, the server EDS performs a step 2', wherein it calculates parameters according to network configuration information and localization. For instance, in case the network TN is a GSM network, the parameters (such as expected levels of received signal) are calculated by taking into account one or more of the following: the relative position between the mobile terminal A and the Base Transceiver Stations of the network TN, the strength of the radiation power of the Base Transceiver Stations, the radiation pattern of the Base Transceiver Stations of the network TN, and so on.

During a successive step 1, the server EDS retrieves the terminal technical information of the mobile terminal A using the terminal identifier of the mobile terminal A by performing sub-steps 11, 12, and 13. Such sub-steps have been already described by referring to FIG. 2, and therefore a detailed description thereof will not be repeated.

During a successive step 3, a measurement indicative of the quality of the signal received from the network TN is taken at the mobile terminal A. For instance, such a measurement may include one or more of the following measurements: a measurement of the received signal power, a measurement of the received signal-to-noise ratio, a measurement of the multipath interference, or the like. In this alternative embodiment, during a successive step 3a, the measurement performed by the mobile terminal A during step 3 is adjusted by taking into account information about terminal technical features which have been retrieved during step 1. This step 3a may for example derive the actual received signal quality (e.g. signal strength) from the measured signal quality, by using the hardware technical features of the mobile terminal such as packaging attenuation, antenna gain, receiver sensitivity, etc.

Then, during a step 4, an environment determination algorithm (possibly having the parameters calculated during step 2') is applied to the adjusted measurement, for determining the environment wherein the mobile terminal A is situated.

As an alternative, step 2' could be performed after step 3. As a further alternative, step 2' could be performed after step 1.

According to embodiments of the present invention, steps 1a, 2', 1, 3a and 4 are performed by the server EDS. The environment determination client CA of the terminal A only has to take the measurement and to transmit it to the server EDS. According to other embodiments of the present invention, only steps 1a, 1 and 2' are performed by the server EDS, which then forwards the retrieved terminal technical features and the possibly calculated parameters to the environment determination client CA. In this latter embodiments, then, the environment determination client CA has to take the measurement, adjust it, apply the environment determination algorithm to the adjusted measurement, and then transmit the result, i.e. the identified environment, to the server EDS. In any case, the server EDS is always responsible of performing step 1, wherein terminal technical feature are retrieved using the terminal identifier.

Figure 2:
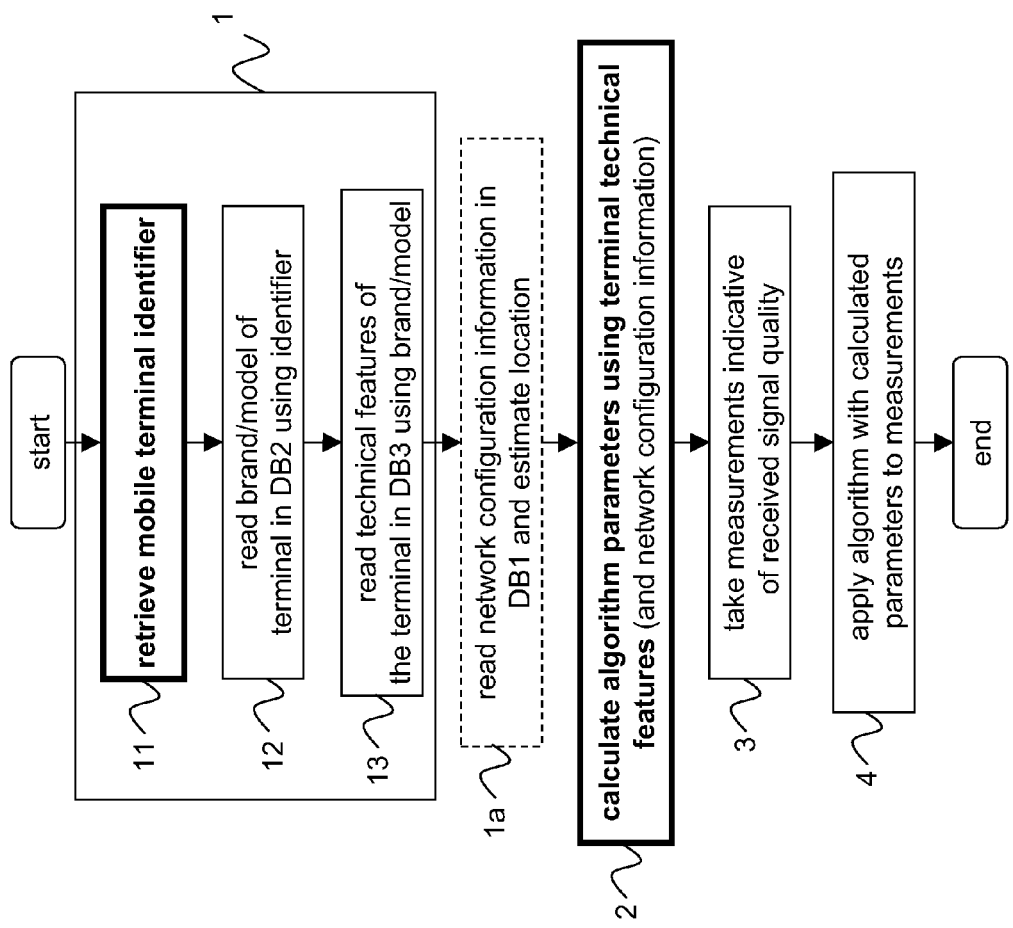
FIG. 2 is a flow chart illustrating an embodiment of the method for determining the environment wherein a mobile terminal is situated.

Different types of environment determination algorithm may be used in step 4 shown in FIGS. 2 and 3. Examples of three different environment determination algorithms will be described herein after by referring to FIGS. 4, 5 and 6.

Figure 4:
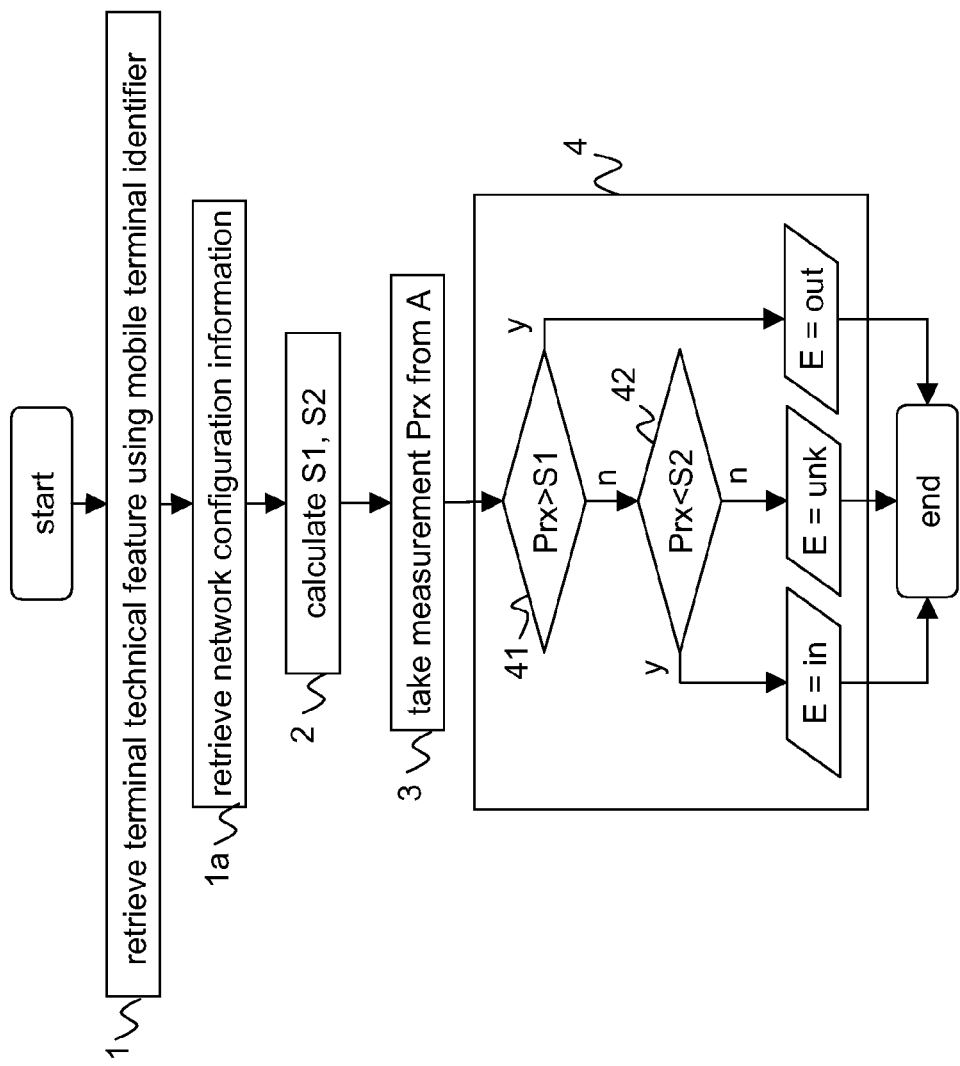
FIG. 4 is a flow chart illustrating a first example of the method for determining the environment wherein a mobile terminal is situated.

FIG. 4 is a flow chart of a first example of the method for determining an environment wherein a mobile terminal (for instance, the mobile terminal A of FIG. 1) is situated, according to the embodiment shown in FIG. 2.

In this first example, it is assumed that the environment determination algorithm employed in step 4 is able to distinguish between two environments: indoor environment (E=in) and outdoor environment (E=out). The algorithm performs this distinction by comparing a measurement of the power Prx of the signal received at the mobile terminal A from the network TN with a first and second thresholds S1 and S2. The first threshold S1 is the minimum power of a signal received by the mobile terminal A from the network TN when the mobile terminal A is situated in an outdoor environment. Similarly, the second threshold S2 is the maximum power of a signal received by the mobile terminal A from the network TN when the mobile terminal A is situated in an indoor environment. Typically, the first threshold S1 is higher than the second threshold S2.

As shown in FIG. 4, during the first step 1 the server EDS retrieves the terminal technical features. Then, during a subsequent step 1a, the server EDS retrieves network configuration information. Then, during a subsequent step 2, the server EDS calculates the values of the thresholds S1 and S2 using the retrieved terminal technical features and the retrieved network configuration information. For instance, the values of the thresholds S1 and S2 may be calculated according to the following formulae:

$$S1 = Prxest - Att; \text{ and} \quad [1]$$

$$S2 = Prxest - Att - Attin. \quad [2]$$

In formulae [1] and [2], Prxest is the estimated mean actual power at the location of the mobile terminal A of a signal transmitted from the network TN, in case the mobile terminal A is in an outdoor environment. Alternatively, Prxest may be taken as the minimum actual power of the radio signal. The estimation of Prxest is performed by making use of the network configuration information stored in the first database DB1, possibly correlated to the approximate geographical location of the mobile terminal. For instance, in case the network TN is a GSM network, Prxest may be estimated as the mean actual power of a signal present at the location of the terminal A transmitted from the Base Transceiver Station serving the cell wherein the terminal A is located. Alternatively, Prxest may be estimated as a mean power of signals at the location of the terminal A transmitted from Base Transceiver Stations serving cells adjacent to the cell wherein the terminal A is located. Therefore, Prxest is mainly dependent on the relative position and orientation between the terminal A and the Base Transceiver Stations of the network TN and on the radiation pattern of the Base Transceiver Stations of the network TN. Prxest may be expressed in dBm.

Further, in formulae [1] and [2], Att indicates a distortion of the received signal quality (e.g. an attenuation of the power) due to the reception features of the mobile terminal A, such as the receiver sensitivity, the antenna gain, and/or attenuation due to the package of the mobile terminal A. The attenuation Att (typically expressed in dB) is then stored into the third database DB3 (or derivable from it), and it can then be retrieved by the server EDS according to the identifier of the mobile terminal A. Finally, Attin is the mean environment attenuation, i.e. it takes into account the mean difference of received signal powers when the mobile terminal A is in indoor and outdoor environment. The actual value of Attin may be predetermined according to preliminary measures. Alternatively, Attin may be assumed equal to the minimum environment attenuation.

After calculation of thresholds S1 and S2, during step 3 the server EDS collects from the mobile terminal A a measure Prx of the power of the signal received by the mobile terminal A from the network TN. Possibly, step 3 could be performed before step 2.

Then, during the successive step 4, the server EDS applies the environment determination algorithm to the measurement Prx. More particularly, the server EDS compares the measurement Prx with the first threshold S1 (step 41). In case the measurement Prx is higher than the first threshold S1, the server EDS determines that the environment wherein the mobile terminal A is situated is an outdoor environment (E=out). On the other hand, in case the measurement Prx is lower than the first threshold S1, the server EDS compares the measurement Prx with the second threshold S2 (step 42). If the measurement Prx is lower than the second threshold S2, the server EDS determines that the environment wherein the mobile terminal A is situated is an indoor environment (E=in). On the other hand, in case the measurement Prx is higher than the second threshold S2 (i.e. Prx is comprised between S2 and S1), the server EDS is not able to determine whether the environment is outdoor or indoor, and therefore the algorithm outputs an unknown environment (E=unk). In the following description, the range of powers of signals received by the terminal A from the network TN for which the algorithm is not able to determine the environment, will be termed "uncertainty range". In the above described example of FIG. 4, the uncertainty range comprises powers of signals received by the terminal A from the network TN between S2 and S1.

In an alternative embodiment, which is not shown in the Figures and which follows the embodiment of FIG. 3, in step 2 the thresholds S1, S2 are calculated according to the following formulae:

$$S1 = Prxest; \text{ and} \quad [1.1]$$

$$S2 = Prxest - Attin, \quad [2.1]$$

wherein the symbols used are the same as above. Therefore, in this step use is only made of the network configuration information stored in the first database DB1, while terminal technical information are not taken into account for calculating S1 and S2.

In this alternative embodiment, before step 4, an additional step (corresponding to step 3a of FIG. 3) is performed, wherein the server EDS adjusts the measurement according to the information stored in, and retrieved from, database DB3. For example, in this step 3a the actual quality of the signal is derived from the measured one, by using the data on the technical features of the mobile terminal.

Then, during the successive step 4, the server EDS applies the environment determination algorithm to the adjusted measurement Prx in the same way described above.

Figure 5:
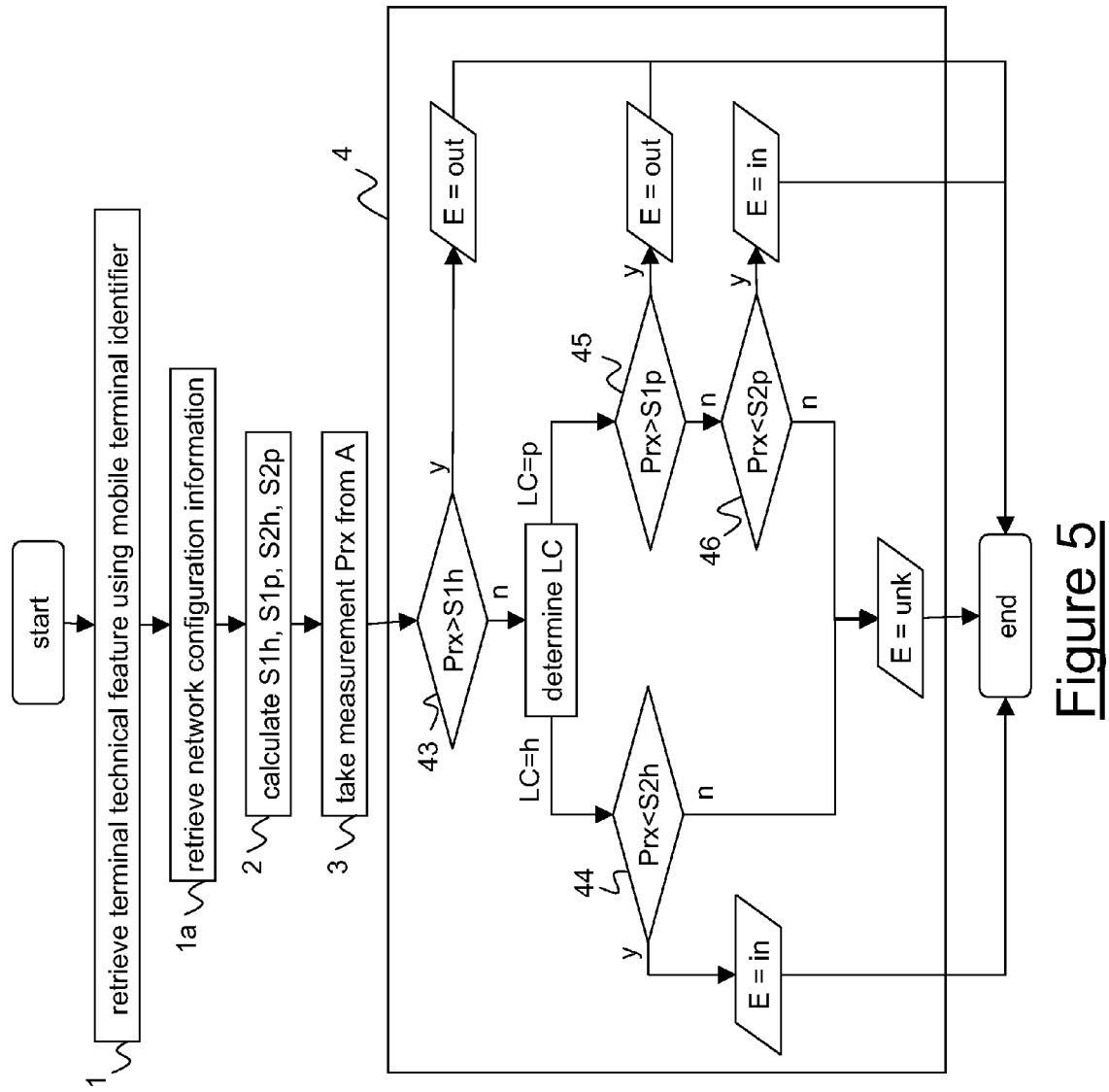
FIG. 5 is a flow chart illustrating a second example of the method for determining the environment wherein a mobile terminal is situated.

FIG. 5 is a flow chart of a second example of the method for determining an environment wherein a mobile terminal (for instance, the mobile terminal A) is situated, wherein the uncertainty range may be reduced compared to the uncertainty range of the example of FIG. 4. As the example of FIG. 4, also this example shown in FIG. 5 follows the embodiment of FIG. 2.

In this second example, it is assumed that the environment determination algorithm employed in step 4 is still able to distinguish between two environments: indoor environment (E=in) and outdoor environment (E=out). In addition, the algorithm is also adapted to take into account a local condition LC of the mobile terminal A, i.e. the algorithm is capable of taking into account whether the mobile terminal is hand-held by the user (LC=h) or it is put into a pocket/bag of the user (LC=p). The algorithm performs a distinction by comparing a measurement of the power Prx of the signal received by the mobile terminal A from the network TN with four thresholds S1$h$, S1$p$, S2$h$ and S2$p$. The threshold S1$h$ is the minimum power of a signal received by the mobile terminal A when the mobile terminal A is situated in a outdoor environment and it is hand-held. The threshold S1$p$ is the minimum power of a signal received by the mobile terminal A when the mobile terminal A is situated in a outdoor environment and it is put in a pocket or a bag. The threshold S2$h$ is the maximum power of a signal received by the mobile terminal A when the mobile terminal A is situated in a indoor environment and it is hand-held. The threshold S2$p$ is the maximum power of a signal received at the mobile terminal A when the mobile terminal A is situated in a indoor environment and it is put in a pocket or a bag. Typically, the following inequality is valid: S1$h$>S1$p$>S2$h$>S2$p$.

As shown in FIG. 5, during the first step 1 the server EDS retrieves the terminal technical features. Then, during a subsequent step 1a, the server EDS retrieves network configuration information from the database DB1. Then, during a subsequent step 2, the server EDS calculates the values of the thresholds S1$h$, S1$p$, S2$h$ and S2$p$. For instance, the values of the thresholds S1$h$, S1$p$, S2$h$ and S2$p$ may be calculated according to the following formulae:

$$S1h = Prxest - Att - Dh; \quad [3]$$

$$S1p = Prxest - Att - Dp; \quad [4]$$

$$S2h = Prxest - Att - Attin - Dh; \text{ and} \quad [5]$$

$$S2p = Prxest - Att - Attin - Dp. \quad [6]$$

In formulae [3] to [6], Prxest, Att and Attin have the same meanings which have already been described by referring to formulae [1] and [2]. Therefore, a detailed description will not be repeated. Moreover, Dh is a positive factor (typically in dB) representing an extra attenuation of the signal received by the mobile terminal A due to the local condition wherein the terminal A is hand-held. Similarly, Dp is a positive factor (typically in dB) representing an extra attenuation of the signal received by the mobile terminal A due to the local condition wherein the terminal A is put in a pocket or a bag of the user. Accordingly, Dp is higher than Dh. Dh may be assumed equal to zero dB.

After calculation of thresholds S1$h$, S1$p$, S2$h$ and S2$p$, during step 3, the server EDS collects from the mobile terminal A a measure Prx of the power of the signal received by the mobile terminal A from the network TN.

Then, during the successive step 4, the server EDS applies the environment determination algorithm to the adjusted measurement Prx. More particularly, the server EDS compares the measurement Prx with the threshold S1$h$ (step 43). In case the measurement Prx is higher than the threshold S1$h$, the server EDS determines that the environment wherein the mobile terminal A is situated is an outdoor environment (E=out). On the other hand, in case the measurement Prx is lower than the threshold S1$h$, the server EDS takes into account the local condition LC of the mobile terminal A, which is assumed to be known by the server EDS. For instance, the local condition may be intrinsic to the type of mobile terminal or to the type of application for which the mobile terminal is used. For instance, in case the mobile terminal is a mobile transceiver for monitoring the position of a vehicle or the like (this is the case of a GPS navigation terminal having GSM capabilities), the local condition of the mobile terminal is predefined, since the mobile terminal is fixed to the vehicle, and it can not change state during operation. In other cases, the local condition may be determined according to the operation that the user is currently performing on his mobile terminal. For instance, if the user is currently using the keyboard of the mobile terminal, the mobile terminal is definitely hand-held, and therefore the local condition is LC=h. Further, the server EDS may also determine the local condition LC of the terminal A by monitoring the power of the signal dynamically received by the terminal A and by analysing relative time variations of such a power. In particular, the variation speed and the variation amplitude are analysed, since particularly fast and weak variations probably indicate changes in the local condition.

In case the local condition of the mobile terminal A is LC=h, the server EDS compares the measurement Prx with the threshold S2$h$ (step 44). If the measurement Prx is lower than the threshold S2$h$, the server EDS determines that the environment wherein the mobile terminal A is situated is an indoor environment (E=in). On the other hand, in case the measurement Prx is higher than the threshold S2$h$ (i.e. Prx is comprised between S2$h$ and S1$h$), the server EDS is not able to determine whether the environment is outdoor or indoor, and therefore the algorithm outputs an unknown environment (E=unk).

In case the local condition of the mobile terminal A is LC=p, the server EDS compares the measurement Prx with the threshold S1$p$ (step 45). If the measurement Prx is higher than the threshold S1$p$, the server EDS determines that the environment wherein the mobile terminal A is situated is an outdoor environment (E=out). On the other hand, in case the measurement Prx is lower than the threshold S1$p$, the server EDS compares the measurement Prx with the threshold S2$p$ (step 46). If the measurement Prx is lower than the threshold S2$p$, the server EDS determines that the environment wherein the mobile terminal A is situated is an indoor environment (E=in). On the other hand, in case the measurement Prx is higher than the threshold S2$p$ (i.e., Prx is comprised between S2$p$ and S1$p$), the server EDS is not able to determine whether the environment is outdoor or indoor, and therefore the algorithm outputs an unknown environment (E=unk).

In an alternative embodiment, which is not shown in the Figures and which follows the embodiment of FIG. 3, in step 2 the thresholds S1$h$, S1$p$, S2$h$, S2$p$ are calculated according to the following formulae:

$$S1h = Prxest - Dh; \quad [3.1]$$

$$S1p = Prxest - Dp; \quad [4.1]$$

$$S2h = Prxest - Dh; \text{ and} \quad [5.1]$$

$$S2p = Prxest - Attin - Dp, \quad [6.1]$$

wherein the symbols used are the same as above. Therefore, in this alternative embodiment, use is only made of the network configuration information stored in the first database DB1, while terminal technical features are not taken into account. In this alternative embodiment, before step 4, an additional step (corresponding to step 3$a$ of FIG. 3) is performed, wherein the server EDS adjusts the measurements collected during step 3 according to the terminal technical feature information retrieved from the third database DB3. For example, in this step 3$a$ the actual quality of the signal is derived from the measured one, by using the terminal technical features.

Then, also in this alternative embodiment, during a successive step 4 the server EDS applies the environment determination algorithm to the adjusted measurement Prx in the same way described above.

By comparing examples of FIGS. 4 and 5, it can be noticed that in the example of FIG. 5 the environment determination algorithm is more complex, and it is able to manage a higher amount of information (i.e., both Prx and LC). This advantageously allows increasing the algorithm accuracy in determining the environment wherein the mobile terminal A is situated, i.e. it allows reducing the uncertainty range.

Figure 6:
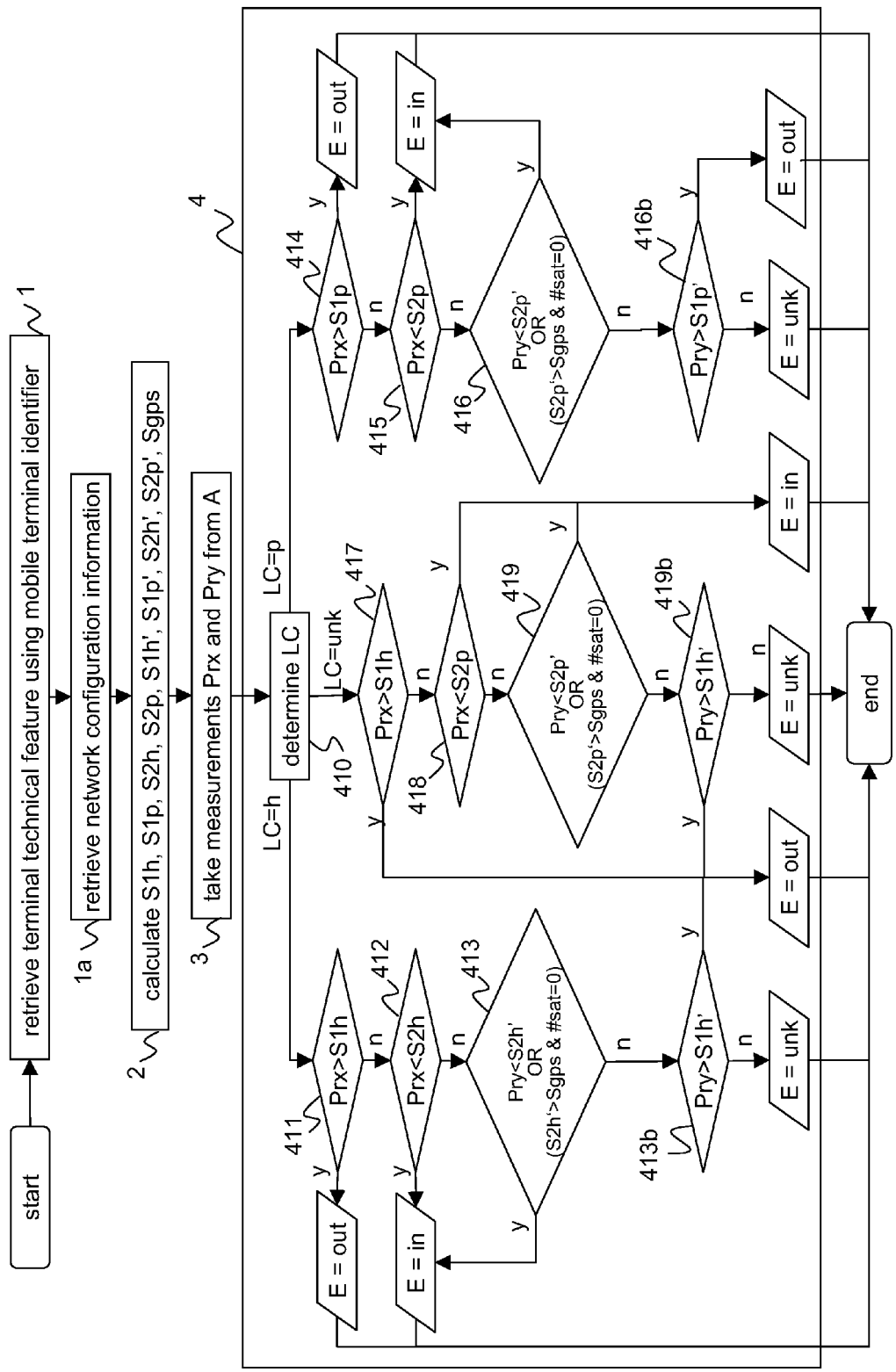
FIG. 6 is a flow chart illustrating a third example of the method for determining the environment wherein a mobile terminal is situated.

FIG. 6 is a flow chart of a third example of the method for determining an environment wherein a mobile terminal (for instance, the mobile terminal A) is situated, wherein the uncertainty range may be further reduced with respect to the uncertainty range of the examples of FIGS. 4 and 5. Again, this example follows the embodiment shown in FIG. 2.

Also in this third example, it is assumed that the environment determination algorithm employed in step 4 is able to distinguish between two environments: indoor environment (E=in) and outdoor environment (E=out). In addition, the algorithm is also adapted to take into account the local condition LC of the mobile terminal A, if the local condition is known. Further, it is assumed that the mobile terminal A is adapted to take, besides the measurement Prx, a further measurement Pry, which is independent from the measurement Prx. For instance, in the hypothesis that the mobile terminal A also comprises a GPS receiver (not shown in FIG. 1) for interacting with the GPS network, such a further measurement Pry could be a measurement of a signal provided by the GPS network, as it will be described in more detail herein after. The GPS is only an example and it should not be considered as a limitation, since the further measurement Pry may vary according to the functionalities of the mobile terminal A. For instance, in case the terminal A is a dual mode terminal, Pry may be a measurement of a signal provided by a Wi-Fi network or a Wi-Max network or a Bluetooth network. Further, the server EDS should preferably be able to access also a GPS network configuration database, comprising current network configuration information about the GPS network (position, radiation pattern, transmission frequencies, transmission power, etc. of each satellite of the GPS network).

As shown in FIG. 6, during the first step 1 the server EDS retrieves the terminal technical features using the terminal identifier. Then, during a step 1$a$, the server EDS retrieves network configuration information. Then, during a step 2, the server EDS calculates the values of the thresholds S1$h$, S1$p$, S2$h$ and S2$p$. For instance, the values of the thresholds S1$h$, S1$p$, S2$h$ and S2$p$ may be calculated according to the above formulae [3] to [6]. Further, during step 2, the server EDS preferably calculates four further thresholds:

$$S1h' = Pesth\_gpsout - Attgps - Dhgps \quad [7]$$

$$S1p' = Pestp\_gpsout - Attgps - Dpgps \quad [8]$$

$$S2h' = Pesth\_gpsind - Attgps - Dhgps; \quad [9]$$

$$S2p' = Pestp\_gpsind - Attgps - Dpgps, \quad [10]$$

wherein S1$h'$ is the minimum power of a signal received by the mobile terminal A from the GPS network when the mobile terminal A is situated in an outdoor environment and it is hand-held, while S1$p'$ is the minimum power of a signal received by the mobile terminal A from the GPS network when the mobile terminal A is situated in an outdoor environment and it is put in a pocket or a bag. On the other hand, S2$h'$ is the maximum power of a signal received by the mobile terminal A from the GPS network when the mobile terminal A is situated in a indoor environment and it is hand-held, while the threshold S2$p'$ is the maximum power of a signal received by the mobile terminal A from the GPS network when the mobile terminal A is situated in a indoor environment and it is put in a pocket or a bag. In formulae [7] to [10], Pesth_gpsout, Pestp_gpsout, Pesth_gpsind and Pestp_gpsind are the estimated received power of a GPS signal received respectively in an outdoor or indoor environment and distinguishing between LC=h or LC=p. Pesth_gpsout, Pestp_gpsout, Pesth_gpsind and Pestp_gpsind are preferably estimated independently of the technical features of the specific GPS receiver, but only typical attenuations in outdoor and indoor environment and GPS satellite positions are taken into account. Attgps is an attenuation which depends on the features of the GPS receiver of the mobile terminal A, and which is therefore stored into the third database DB3. Further, Dhgps is a tolerance range of the estimated power of a signal received at the mobile terminal A from the GPS network, in case the terminal A is hand-held. Similarly, Dpgps is a tolerance range of the estimated power of a signal received at the mobile terminal A, in case the terminal A is put in a pocket or a bag of the user. Moreover, the server EDS reads from the third database DB3 a further parameter Sgps, which corresponds to the minimum power which can be received by the GPS receiver of the mobile terminal A. Typically the sensitivity Sgps ranges from about −135 dBm to −160 dBm.

After calculating thresholds S1h, S1p, S2h, S2p, S1h', S1p', S2h' and S2p', and after reading Sgps, during the successive step 3, the server EDS collects from the mobile terminal A the measurement Prx of the power of the signal received by the mobile terminal A from the network TN and a measurement Pry of the power of the signal received by the mobile terminal A from the GPS network.

Then, during the successive step 4, the server EDS applies the environment determination algorithm to the adjusted measurements Prx and Pry. More particularly, the server EDS firstly tries to determine the local condition of the mobile terminal A (step 410).

In case the local condition is LC=h, the server EDS compares the measurement Prx with the threshold S1h (step 411). In case the measurement Prx is higher than the threshold S1h, the server EDS determines that the environment wherein the mobile terminal A is situated is an outdoor environment (E=out). On the other hand, in case the measurement Prx is lower than the threshold S1h, the server EDS compares the measurement Prx with the threshold S2h (step 412). If the measurement Prx is lower than the threshold S2h, the server EDS determines that the environment wherein the mobile terminal A is situated is an indoor environment (E=in). On the other hand, in case the measurement Prx is higher than the threshold S2h (i.e. Prx is comprised between S2h and S1h), the server EDS compares the measurement Pry with the threshold S2h' and it also compares the threshold S2h' with the Sgps parameter (step 413). In case Pry is lower than S2h' or in case the number of received satellite signals is equal to zero and S2h' is higher than Sgps, the server EDS determines that the environment wherein the mobile terminal A is situated is an indoor environment (E=in). Otherwise (step 413b), the server EDS compares Pry with S1h' and, if Pry is higher than S1h', the server EDS determines that the environment wherein the mobile terminal A is situated is an outdoor environment (E=out). On the other hand, if Pry is lower than S1h', the server EDS is not able to determine whether the environment is outdoor or indoor, and therefore the algorithm outputs an unknown environment (E=unk).

In case the local condition is LC=p, the server EDS compares the measurement Prx with the threshold S1p (step 414). In case the measurement Prx is higher than the threshold S1p, the server EDS determines that the environment wherein the mobile terminal A is situated is an outdoor environment (E=out). On the other hand, in case the measurement Prx is lower than the threshold S1p, the server EDS compares the measurement Prx with the threshold S2p (step 415). If the measurement Prx is lower than the threshold S2p, the server EDS determines that the environment wherein the mobile terminal A is situated is an indoor environment (E=in). On the other hand, in case the measurement Prx is higher than the threshold S2p (i.e. Prx is comprised between S2p and S1p), the server EDS compares the measurement Pry with the threshold S2p' and it also compares the threshold S2p' with the Sgps parameter (step 416). In case Pry is lower than S2p' or in case the number of received satellite signals is equal to zero and S2p' is higher than Sgps, the server EDS determines that the environment wherein the mobile terminal A is situated is an indoor environment (E=in). Otherwise (step 416b), the server EDS compares Pry with S1p' and, if Pry is higher than S1p', the server EDS determines that the environment wherein the mobile terminal A is situated is an outdoor environment (E=out). If Pry is lower than S1p', the server EDS is not able to determine whether the environment is outdoor or indoor, and therefore the algorithm outputs an unknown environment (E=unk).

In case the local condition is unknown (LC=unk), the server EDS compares the measurement Prx with the threshold S1h (step 417). In case the measurement Prx is higher than the threshold S1h, the server EDS determines that the environment wherein the mobile terminal A is situated is an outdoor environment (E=out). On the other hand, in case the measurement Prx is lower than the threshold S1h, the server EDS compares the measurement Prx with the threshold S2p (step 418). If the measurement Prx is lower than the threshold S2p, the server EDS determines that the environment wherein the mobile terminal A is situated is an indoor environment (E=in). On the other hand, in case the measurement Prx is higher than the threshold S2p (i.e. Prx is comprised between S2p and S1h), the server EDS compares the measurement Pry with the threshold S2p' and it also compares the threshold S2p' with the Sgps parameter (step 419). In case Pry is lower than S2p' or in case the number of received satellite signals is equal to zero and S2p' is higher than Sgps, the server EDS determines that the environment wherein the mobile terminal A is situated is an indoor environment (E=in). Otherwise (step 419b), the server EDS compares Pry with S1h' and, if Pry is higher than S1h', the server EDS determines that the environment wherein the mobile terminal A is situated is an outdoor environment (E=out). On the other hand, if Pry is lower than S1h', the server EDS is not able to determine whether the environment is outdoor or indoor, and therefore the algorithm outputs an unknown environment (E=unk).

In an alternative embodiment, which is not shown in the Figures and which follows the embodiment of FIG. 3, in step 2 the thresholds S1h, S1p, S2h, S2p may be calculated according to the above formulae [3.1], [4.1], [5.1], [6.1], while the thresholds S1h', S1p', S2h', S2p' may be calculated according to formulae:

$$S1h' = Pesth\_gpsout - Dhgps \qquad [7.1]$$

$$S1p' = Pestp\_gpsout - Dpgps \qquad [8.1]$$

$$S2h' = Pesth\_gpsind - Dhgps; \qquad [9.1]$$

$$S2p' = Pestp\_gpsind - Dpgps, \qquad [10.1]$$

wherein the symbols used are the same as above. In this alternative embodiment, use is preferably made only of the network configuration information stored in the first database DB1, while terminal technical information are not taken into account. In this alternative embodiment, before step 4, an additional step (corresponding to step 3a of FIG. 3) is performed, wherein the server EDS adjusts the measurements collected during step 3 according to the terminal technical feature information retrieved from the third database DB3. Then, also in this alternative embodiment, during a successive step 4 the server EDS applies the environment determination algorithm to the adjusted measurement Prx in the same way described above.

Therefore, by comparing FIG. 6 with FIG. 5, it can be noticed that advantageously the server EDS uses the further measurement Pry taken by the mobile terminal A for increasing the accuracy of the environment determination. In fact, both in case the local condition is unknown and in case the local condition is known, if the measurement Prx is comprised into the uncertainty range, the server EDS may use the measurement Pry for reducing the uncertainty range by raising its lower limit, so that the measurement Prx falls outside the reduced uncertainty range. The accuracy of the algorithm of FIG. 6 is increased at the cost of a higher resource usage at the environment determination server, since the number of parameters to be calculated and the number of operations of the algorithm are increased, compared to the algorithms shown in FIGS. 4 and 5. Also the resource usage at the mobile terminal is increased, since a higher number of measurements are taken and transmitted to the server.

As already mentioned, according to embodiments of the present invention, the environment determination server is adapted to perform step 1, 2 and 4 of the flow chart of FIG. 2, while the environment determination client installed on a mobile terminal simply performs step 3. In these embodiments, optionally, the environment determination server is adapted to execute different environment determination algorithms with different accuracies. Therefore, advantageously, when the server has to determine an environment of a terminal, the server can choose the most suitable algorithm to be executed, according to the accuracy required by the particular application. This advantageously allows to choose an algorithm with low accuracy in case only a rough determination of the environment is required, and to choose an algorithm with higher accuracy in case a more precise determination of the environment is required. This allows optimising the usage of server and mobile terminal resources.

As already mentioned, according to other embodiments of the present invention, the environment determination server is adapted to perform only steps 1 and 2 of the flow chart of FIG. 2, while the environment determination client installed on a mobile terminal performs steps 3 and 4. Also in these embodiments, optionally, the environment determination client is adapted to execute different environment determination algorithms with different accuracies. Therefore, also the environment determination client may advantageously choose the most suitable algorithm in terms of accuracy and resource usage.

The method for determining the environment wherein a mobile terminal is situated described above by referring to FIGS. 2 to 6 can be employed in different mobile radiocommunication services. In particular, a first type of service may require a determination of the environment wherein the mobile terminal is situated when the service is activated. In such cases, the sequence of steps 1, 2, 3 and 4 is performed only once. Besides, a second type of service may require a continuous monitoring of the environment wherein the mobile terminal is situated while the service is provided to the user. In such cases, the sequence of steps 1, 2, 3 and 4 is periodically performed.

Figure 7:
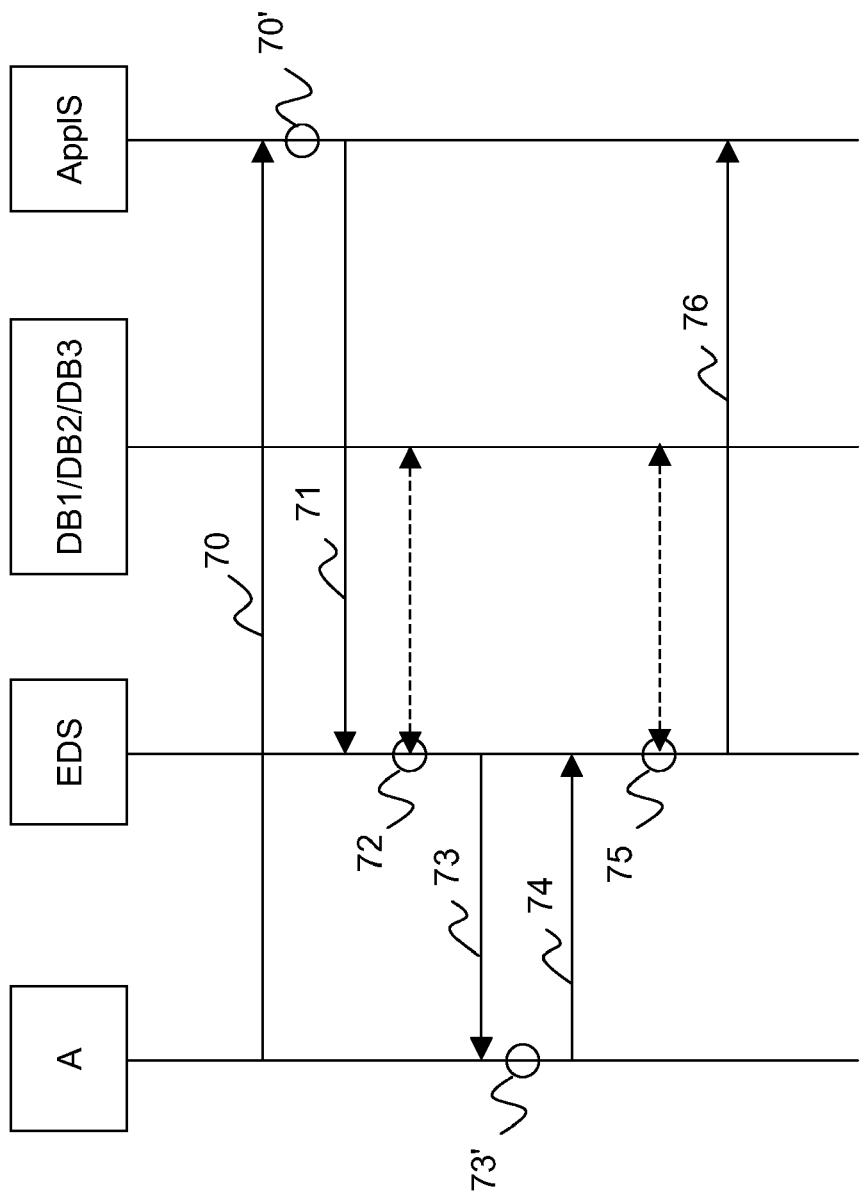
FIG. 7 schematically shows messages exchanged within the network of FIG. 1 during a first exemplary service employing the embodiment shown in FIG. 2.

FIG. 7 schematically shows an example of a service of the first type. In this case, it is assumed that the environment determination algorithm is performed by the server EDS.

When the user of the mobile terminal A desires to activate such a service, he transmits by his mobile terminal A an activation request 70 to an application server ApplS of the network TN, which is responsible of managing such a service. Upon reception of the service activation request 70, the application server determines that the required service needs an environment determination (step 70'). Therefore, the application server ApplS transmits to the environment determination server EDS a request 71 of performing an environment determination. The server EDS determines the identifier of the mobile terminal A, and then it uses the identifier for reading into the database DB3 the available functions (GSM only, Wi-Fi operable, GPS operable, . . . ) of the mobile terminal A (step 72). During step 72, the server EDS further selects the algorithm to be used and the measurements which it needs from the mobile terminal A. Then, the server EDS sends a measurement activation message 73 to the mobile terminal A (in particular, to its client CA), indicating the measurement that the mobile terminal A has to perform and to send back to the EDS server. Preferably, the measurement activation message 73 also comprises a maximum time for sending back a measurement from the terminal A to the EDS server. Then, the mobile terminal A performs the requested measurement (step 73'), and within the maximum time it sends a response message 74 comprising the measurement to the EDS server. Then, the server EDS, during a step 75, interacts with the databases D1, D2 and DB3 for calculating the parameters and for applying the algorithm with the calculated parameters to the measurements, thus determining the environment wherein the mobile terminal A is situated. Steps 72 and 75 may be performed contemporarily. Then, the server EDS informs the application server ApplS of the determination by transmitting it a notification message 76. Further steps of the service are not shown, since they are not relevant to the present description.

Figure 8:
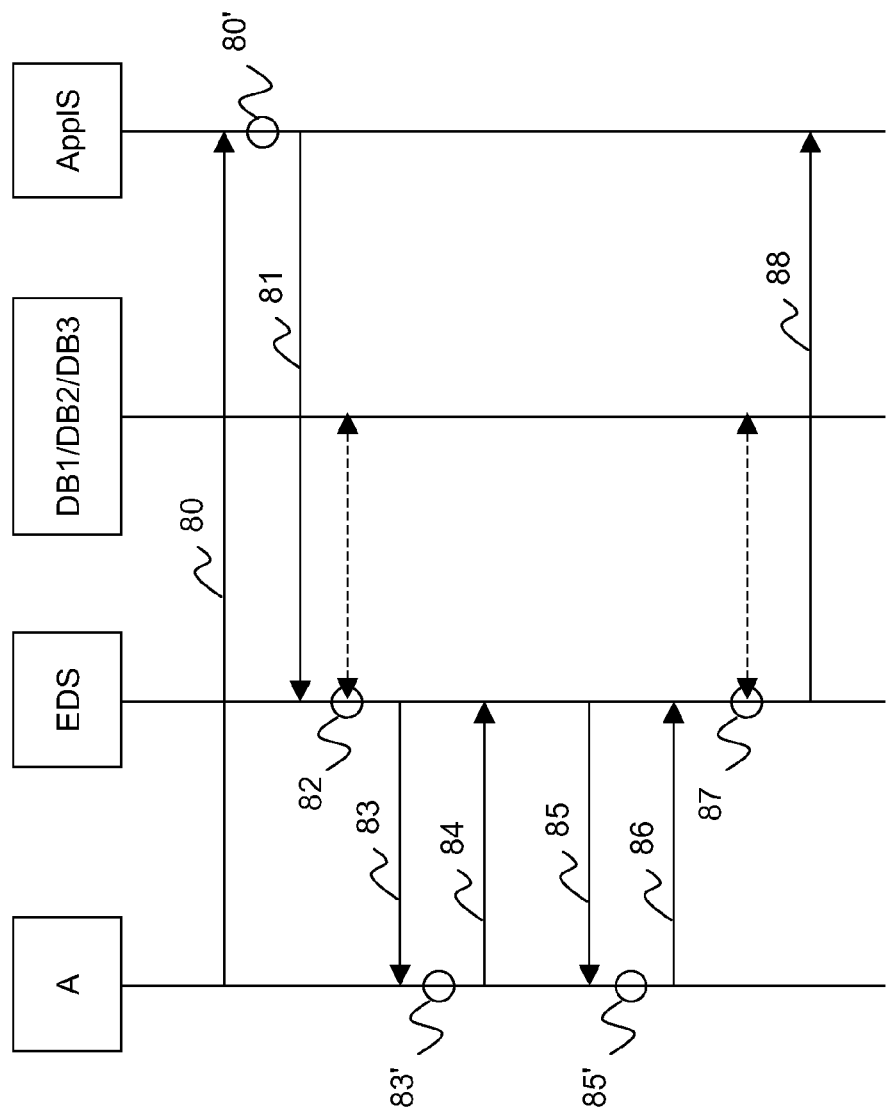
FIG. 8 schematically shows messages exchanged within the network of FIG. 1 during a second exemplary service employing the embodiment shown in FIG. 2.

FIG. 8 schematically shows an example of a service of the second type. In this case, it is assumed that a first environment determination algorithm is performed by the server EDS while a second environment determination algorithm is performed by the environment determination client CA. The accuracy of the second algorithm is supposed to be lower than the accuracy of the first algorithm.

When the user of the mobile terminal A desires to activate such a service, he transmits by his terminal A an activation request 80 to an application server ApplS of the network TN, which is responsible of managing such a service. Upon reception of the service activation request 80, the application server ApplS determines that the required service requires an environment monitoring (step 80'). Therefore, the application server ApplS transmits to the environment determination server EDS a request 81 of performing an environment monitoring. The server EDS determines the identifier of the mobile terminal A, and then it uses the identifier for reading into the database DB3 the available functions (GSM only, Wi-Fi operable, GPS operable, . . . ) of the mobile terminal A (step 82). During step 82, the server EDS further selects the events about which it wants to be informed by the terminal A. For instance, the server EDS may desire to be informed by the terminal A about transitions of the mobile terminals A from a first environment to a second environment. Further, during step 82 the server EDS calculates the parameters for the second algorithm. Then, the server EDS sends a monitoring activation message 83 to the mobile terminal A (in particular, to its client CA), indicating the calculated parameters which the client CA will have to use for executing the second algorithm and the events about which it wants to be informed. Then, the client CA of the mobile terminal A starts monitoring the environment by cyclically performing steps 2, 3 and 4 of FIG. 2 (step 83'). For instance, the algorithm executed by the client CA may be the one shown in FIG. 4. When the client CA detects an event which is interesting for the server EDS, it transmits a trigger message 84 to the server EDS. Then, the server may transmit to the mobile terminal A a request 85 of stopping monitoring and starting to perform new measurements. Such new measurements are preferably different from the previous measurements performed by the mobile terminal A for executing the second algorithm, since they will be used by the server EDS for implementing the first algorithm, which is more accurate. Then, the mobile terminal A performs the requested new measurements (step 85'), and it sends a response message 86 comprising the new measurements to the EDS server. Then, the server EDS, during a step 87, interacts with the databases DB1, DB2 and DB3 for calculating the parameters of the first algorithm and for applying the first algorithm to the measurements, thus determining in a more accurate way the environment wherein the mobile terminal A is situated. Then, the server EDS informs the application server ApplS of the determination by transmitting it a notification message 88.

Figure 9:
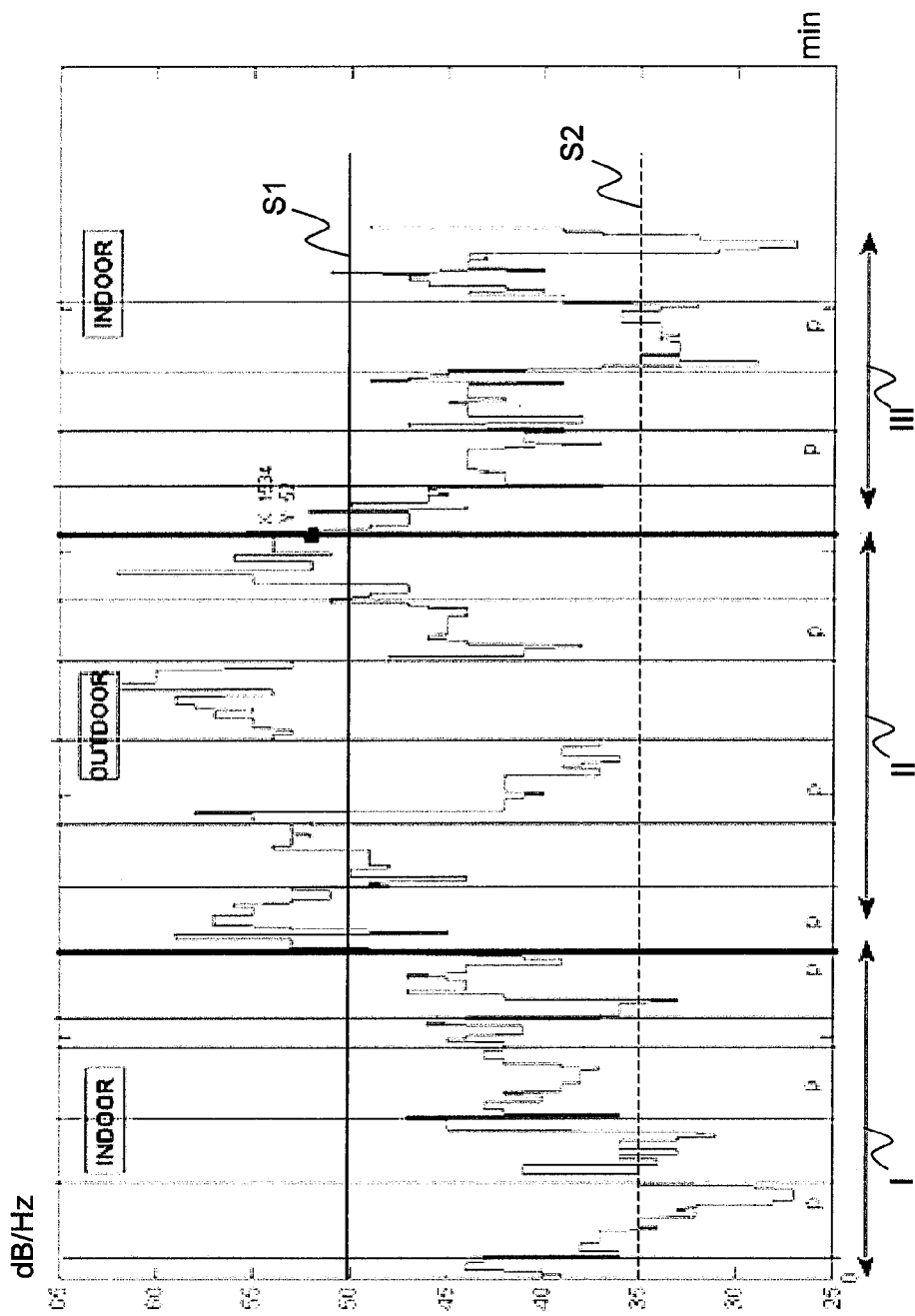
FIG. 9 is a time diagram of experimental measurements relative to a mobile terminal of a mobile radiocommunication network.

FIG. 9 shows a first example of experimental measurements for implementing the method according to embodiments of the present invention.

In particular, FIG. 9 shows a time diagram of the power of a signal received by a mobile terminal of a GSM network from the Base Transceiver Station serving the cell wherein the mobile terminal is located at that time, while the mobile terminal is held by a user walking along a predetermined path. While walking, the user changes local conditions of the mobile terminal, by alternately holding the mobile terminal by hands and putting it in a pocket/bag. Further, while walking the user performs a first passage indoor/outdoor and a second passage outdoor/indoor.

The signal power on the time diagram of FIG. 9 is expressed in dB/Hz. Three different zones I, II, III can be identified in the time diagram. Even though the signal power exhibits strong oscillations in every zone, it can be noticed that the mean signal power in the second zone II is significantly higher than the mean signal power in first and third zones I and III. Therefore, it can be deduced that while in zones I and III the mobile terminal is situated in indoor environment, in zone II the mobile terminal is situated in outdoor environment.

Besides, in zones I and III, the signal power always has a value lower than about 50 dB/Hz, while in the zone II the signal power always has a value higher than 35 dB/Hz. Therefore, by referring to the example of FIG. 4, by setting the threshold S1 at 50 dB/Hz and the threshold S2 at 35 dB/Hz, outdoor and indoor environment can be advantageously discriminated in the time diagram of FIG. 9. Hence, each time the power signal is lower than S2=35 dB/Hz, the algorithm of FIG. 4 determines that the environment wherein the mobile terminal is situated is an indoor environment. On the other hand, each time the power signal is higher than S1=50 dB/Hz, the algorithm of FIG. 4 determines that the environment wherein the mobile terminal is situated is an outdoor environment. In the example of FIG. 9, therefore, the uncertainty range is of 15 dB/Hz.

Figure 10:
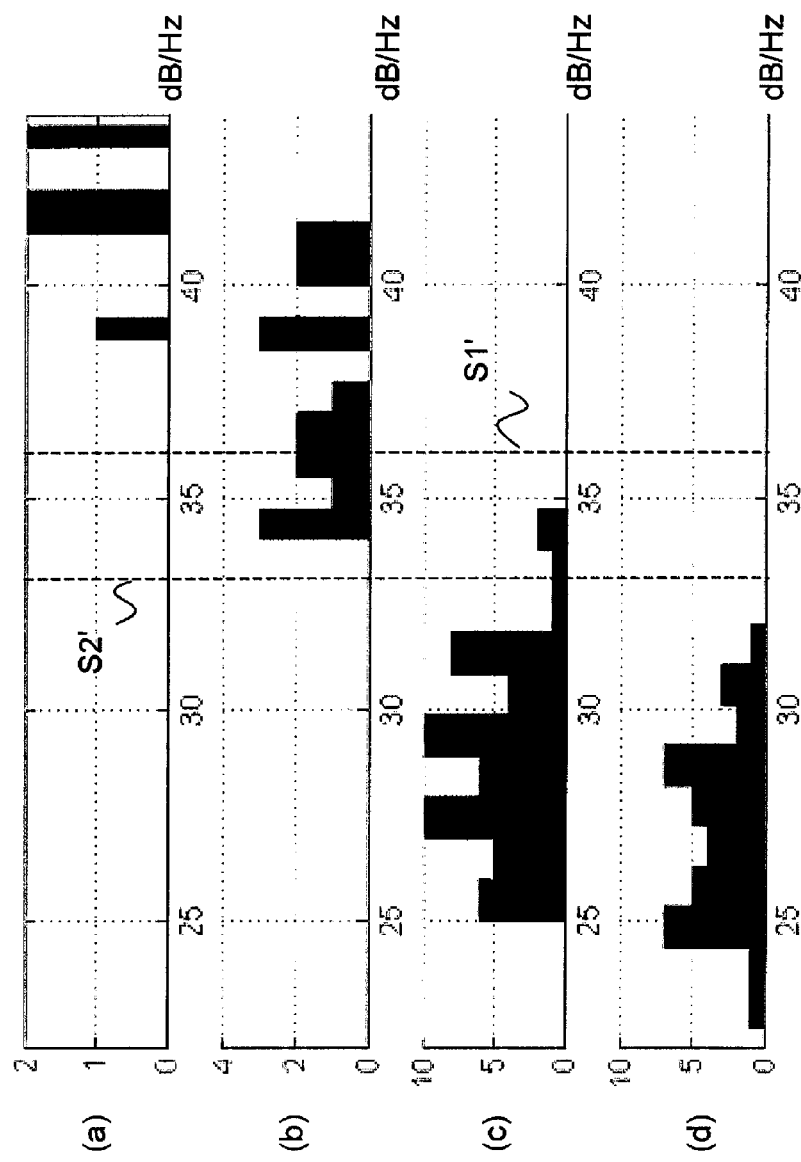
FIG. 10 is a diagram of experimental measurements relative to a mobile terminal equipped with a GPS receiver.

FIG. 10 shows a second example of experimental measurements for implementing the method according to embodiments of the present invention.

In particular, FIG. 10 shows four different diagrams of the signal to noise ratio (expressed in dB/Hz on the horizontal axis) of a GPS signal received by a mobile terminal equipped with a GPS receiver from the GPS network (in particular, from four predetermined satellites of the GPS network). On the vertical axis it is shown the number of occurrences of any measured signal to noise ratio. Each diagram corresponds to a different environment wherein the mobile terminal is situated. In particular, the diagram (a) corresponds to an open-sky outdoor environment, the diagram (b) corresponds to a urban outdoor environment, the diagram (c) corresponds to a light-indoor environment and the diagram (d) corresponds to an indoor environment.

As shown in FIG. 10, the GPS signal to noise ratio in diagrams (a) and (b) (i.e. in case of open-sky outdoor environment and urban outdoor environment) is always higher than 34 dB/Hz. On the other hand, the GPS signal to noise ratio in diagrams (c) and (d) (i.e. in case of light indoor and indoor environment) is always lower than 35 dB/Hz. Therefore, in this case, by referring to the example of FIG. 6, wherein GPS signal to noise ratio is used for reducing the uncertainty range, by setting a threshold S1' at 36 dB/Hz and a threshold S2' at 33 dB/Hz, outdoor and indoor environment can be advantageously discriminated in the diagrams of FIG. 10. Hence, each time the signal to noise ratio is lower than S2'=33 dB/Hz, the algorithm of FIG. 6 determines that the environment wherein the mobile terminal is situated is an indoor environment. On the other hand, each time the signal to noise ratio is higher than S1'=36 dB/Hz, the algorithm of FIG. 6 determines that the environment wherein the mobile terminal is situated is an outdoor environment. In the example of FIG. 10, therefore, the uncertainty range is of 3 dB/Hz only.

The invention claimed is:

1. A method of determining an environment wherein a mobile terminal of a mobile radiocommunication network is situated, said mobile terminal being associated with an identifier, comprising:
   i) retrieving said identifier;
   ii) retrieving at least one technical feature of said mobile terminal according to said identifier, said one technical feature being related to a capability of said mobile terminal of receiving a radio signal;
   iii) taking a measurement indicative of a quality of said radio signal at said mobile terminal;
   iv) adjusting at least one of at least one parameter and said measurement according to said at least one technical feature; and
   v) applying to said measurement an operation for determining said environment, said operation depending on said at least one parameter.

2. The method according to claim 1, wherein at least steps i) and ii) are performed at a network apparatus of said mobile radiocommunication network.

3. The method according to claim 1, wherein said identifier is an international mobile equipment identity of said mobile terminal.

4. The method according to claim 1, wherein step ii) comprises reading in a first database at least one of a brand and a model of said mobile terminal according to said identifier and reading said at least one technical feature in a second database according to said at least one of the brand and the model of said mobile terminal.

5. The method according to claim 1, wherein said at least one technical feature comprises one or more of: a sensitivity of a receiver of said radio signal in said mobile terminal, an attenuation of said radio signal due to a package of the mobile terminal, and an equivalent antenna gain of a receiver of said radio signal in the mobile terminal.

6. The method according to claim 1, wherein said radio signal is emitted by said mobile radiocommunication network.

7. The method according to claim 1, wherein said radio signal belongs to a satellite positioning system network.

8. The method according to claim 1, wherein step iv) further comprises adjusting according to a geographic position of said mobile terminal.

9. The method according to claim 1, wherein said measurement comprises one or more of the following measurements:

a measurement of received signal power, a measurement of received signal-to-noise ratio, and a measurement of multipath interference.

10. The method according to claim 1, wherein step iv) and step v) are performed by said mobile terminal.

11. The method according to claim 1, wherein step iv) and step v) are performed by a network apparatus of said mobile radiocommunication network.

12. A mobile radiocommunication network comprising:
   a mobile terminal associated with an identifier, said mobile terminal capable of being adapted to take a measurement indicative of a quality of a radio signal received at said mobile terminal;
   a first database storing at least one technical feature of said mobile terminal related to the capability of said mobile terminal of receiving said radio signal;
   a network apparatus capable of being adapted to retrieve said at least one technical feature of said mobile terminal from said first database according to said identifier;
   a processor capable of being adapted to apply to said measurement an operation for determining an environment wherein said mobile terminal is situated, said operation depending on at least one parameter, wherein said processor is further adapted to adjust at least one of said at least one parameter and said measurement according to said at least one technical feature.

13. The mobile radiocommunication network according to claim 12, wherein said processor is in said network apparatus.

14. The mobile radiocommunication network according to claim 12, wherein said processor is in said mobile terminal.

15. The mobile radiocommunication network according to claim 12, wherein said identifier is an international mobile equipment identity of said mobile terminal.

16. The mobile radiocommunication network according to claim 12, further comprising a second database storing at least one of a brand and a model of said mobile terminal, said network apparatus capable of being adapted to read in said second database at least one of the brand and the model of said mobile terminal according to said identifier, said network apparatus capable of being adapted to retrieve said at least one technical feature of said mobile terminal from said first database according to at least one among the brand and the model of said mobile terminal.

17. The mobile radiocommunication network according to claim 12, wherein said at least one technical feature comprises one or more of: a sensitivity of a receiver of said radio signal in said mobile terminal, an attenuation of said radio signal due to a package of the mobile terminal, and an equivalent antenna gain of a receiver of said radio signal in the mobile terminal.

18. The mobile radiocommunication network according to claim 12, wherein said radio signal belongs to said mobile radiocommunication network.

19. The mobile radiocommunication network according to claim 12, wherein said radio signal belongs to a satellite positioning system network.

20. The mobile radiocommunication network according to claim 12, wherein said processor is capable of being further adapted to adjust at least one among said at least one parameter and said measurement according to a geographic position of said mobile terminal.

21. The mobile radiocommunication network according to claim 12, wherein said measurement comprises one or more of the following measurements: a measurement of received signal power, a measurement of received signal-to-noise ratio, and a measurement of multipath interference.

22. A non-transitory computer-readable medium comprising software instructions that, when executed by a computer, determines an environment wherein a mobile terminal of a mobile radiocommunication network is situated, said mobile terminal being associated with an identifier, said software instructions comprising:
   i) an identifier retrieving code for retrieving said identifier;
   ii) a technical feature retrieving code for retrieving at least one technical feature of said mobile terminal according to said identifier, said one technical feature being related to a capability of said mobile terminal of receiving a radio signal;
   iii) a reading code for reading a measurement indicative of a quality of said radio signal at said mobile terminal;
   iv) an adjusting code for adjusting at least one of at least one parameter and said measurement according to said at least one technical feature; and
   v) an applying code for applying to said measurement an operation for determining said environment, said operation depending on said at least one parameter.

23. The non-transitory computer-readable medium according to claim 22, wherein said applying code and said adjusting code reside on a network apparatus of said mobile radiocommunication network.

24. The non-transitory computer-readable medium according to claim 22, wherein said applying code and said adjusting code reside on said mobile terminal.

* * * * *